Nov. 21, 1950  J. A. V. TURCK  2,531,089
CALCULATING MACHINE
Filed Feb. 20, 1947  4 Sheets-Sheet 1

Inventor:
Joseph A. V. Turck
Attys.

Nov. 21, 1950  J. A. V. TURCK  2,531,089
CALCULATING MACHINE
Filed Feb. 20, 1947  4 Sheets-Sheet 3
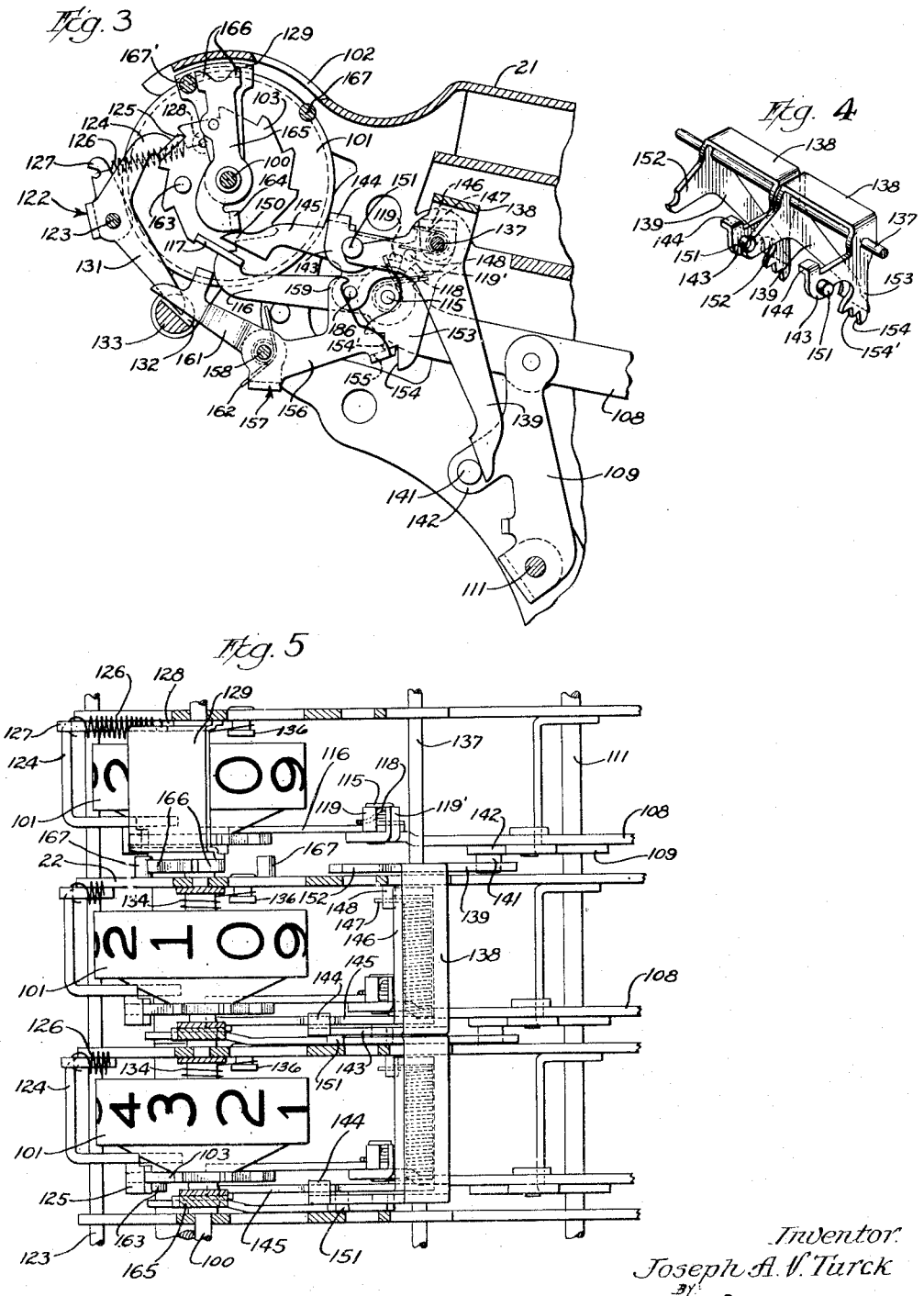
Inventor:
Joseph A. V. Turck

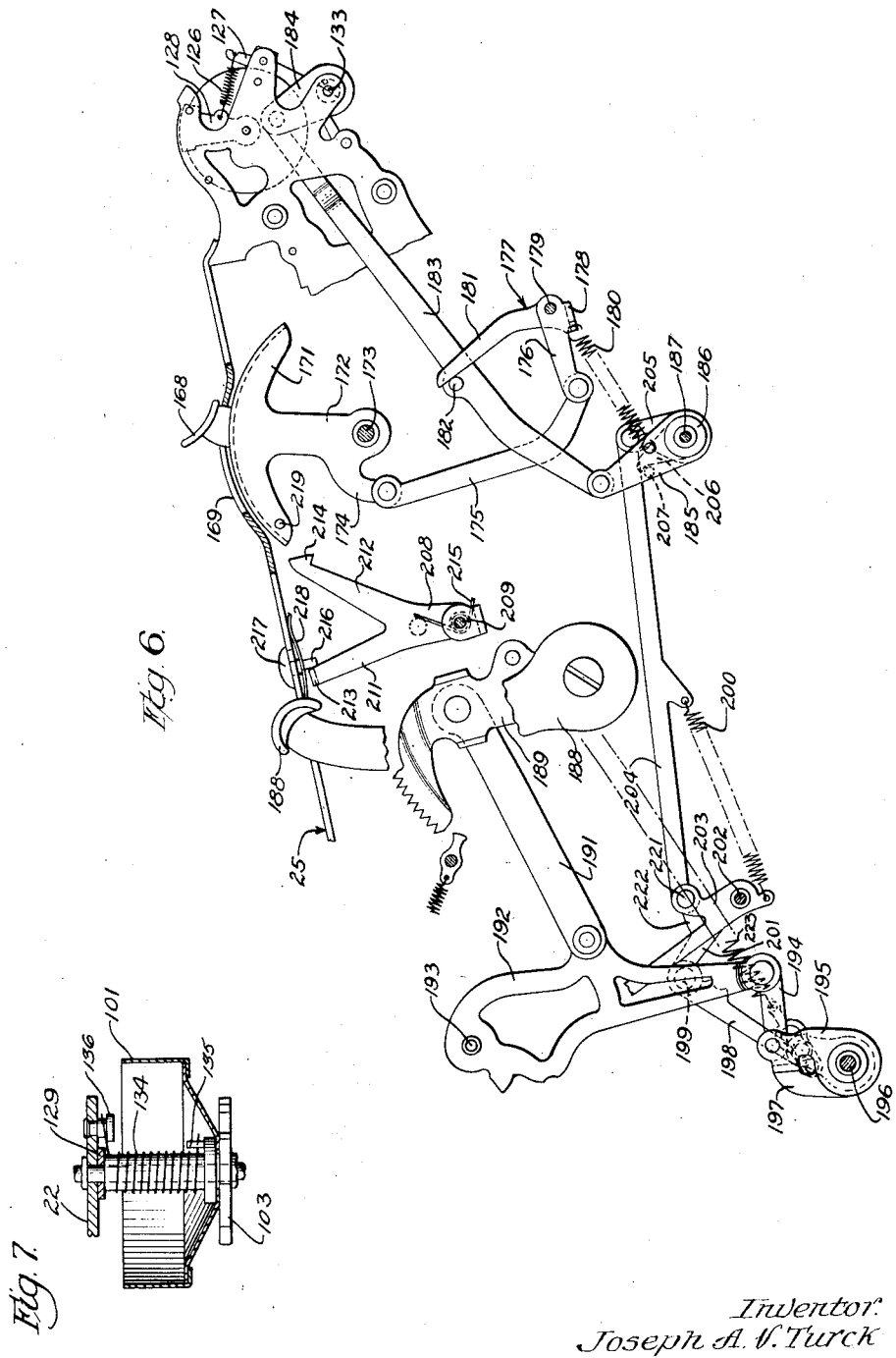

Patented Nov. 21, 1950

2,531,089

UNITED STATES PATENT OFFICE 2,531,089

CALCULATING MACHINE

Joseph A. V. Turck, Wilmette, Ill., assignor to Felt & Tarrant Manufacturing Company, Chicago, Ill., a corporation of Illinois Application February 20, 1947, Serial No. 729,735

9 Claims. (Cl. 235—82)

My invention relates in general to means for registering the number of times a group of denominational orders of a calculating machine is operated either in multiplication or division and has more particular reference to the provision of such registering means for each denominational order of a key-responsive power-driven or key-driven calculating machine and provision of devices to prevent registration in all orders except the order in which the rightmost key of the multiplicand or of the divisor is depressed.

I am aware that means has been provided heretofore for registering the multiplier in positive forms of calculation and for registering the divisor in negative forms of calculation in calculating machines which have their accumulator mechanism in a shiftable carriage, commonly known as key set crank-operated machines, and also in such devices as are generally called mezzanine keyboards designed to operate on key-driven or key-responsive calculating machines which, like the shiftable carriage, provides means for localizing the proper order for registration in accordance with the shifting of the superimposed keyboard. However, the key set, crank or power-driven machines are too slow where rapid calculation is required, and the mezzanine keyboard only slows down the key responsive power-operated or the key-operated calculating machine to a level with the key set crank or power operated type—in fact when purchased such devices are soon laid aside as time wasters.

With the above in view, the main object of the present invention is to provide means whereby the mere operation of the keys of either a key-responsive or power-operated calculating machine will under normal operation provide such registration.

Another object of the invention is to provide a key stroke register for each order of actuating mechanism, each operable to register the number of manual key strokes made in that order if it happens to be the rightmost order of the multiplier or of the divisor and the provision of means for preventing operation of the orders to the left from receiving registering actuation.

Another object of the invention is to provide a visible signal to inform the operator that a key or keys in any particular order has been depressed more times than the highest figure in the register, which in decimals would be nine and vary in accordance with the values represented by the various orders, such as are found in English or India currency and fractional orders.

Another object of the invention is to provide manually operated means for clearing or zeroizing the stroke register.

Still another important object of the invention is to provide means for clearing or zeroizing the stroke register by and during the operation of the clearing or zeroizing devices for the accumulator mechanism of the machine to which the stroke register is affixed.

A further object is to provide means for breaking all connection between the stroke register and their actuating devices in the various denominational orders or the returning of them to operative order at the will of the operator.

Other objects and advantages of the invention will become apparent from the following detailed description of the preferred embodiment disclosed in the accompanying drawings, in which:

Fig. 3 is an enlarged sectional view of the stroke registering mechanism;

Fig. 4 is a perspective view of the overlapping means for causing the stroke registering mechanism in all orders to the left of the rightmost order operated to become inoperative;

Fig. 5 is a partial top plan view of the stroke registering mechanism;

Fig. 6 is a side elevation showing the zeroizing mechanism for the stroke registering mechanism and its connection with the regular register zeroizing devices.

Fig. 7 is a sectional view of a register wheel.

For purposes of illustration my invention has been shown as embodied in a key-responsive, power actuated calculating machine similar to that shown and described in United States Letters Patent No. 2,021,393, issued November 19, 1935, and No. 2,063,962, issued December 15, 1936. In the exemplary machine, multiplication is performed by a process of repeated addition of the multiplicand. The usual practice is to hold the fingers, starting at the left of the machine, on the keys representing the multiplicand and depress them the number of times represented by the first, or left-hand figure in the multiplier, then shifting one column to the right and again depressing the keys the number of times represented by the next figure in the multiplier, etc., until the multiplicand has been depressed a number of times corresponding to the last or units figure of the multiplier. Accordingly, if the number of key depressions made in the column representing the units figure of the multiplicand is registered at the commencement of the calculation and thereafter for each successive shift to the right, when the calculation is complete the multiplier will be registered, thereby providing a visible check on the accuracy of the operator's manipulations.

In rapid multiplication, particularly where the multiplicand consists of several figures, the operator may only partially depress a key which, in the machine shown, will result in the locking of all the keys in columns other than that in which the partial key stroke occurred. This column is left unlocked in order that the operator may fully depress the key on which the error occurred, unlock the keyboard and continue. Without the stroke register the operator in general becomes confused relative to her mental stroke count and as a result proceeds to zeroize the numeral wheels and again begins the calculation. It will be understood, therefore, that provision of mechanism which will at a glance inform the operator after the error has been corrected which particular columns or orders of keys were being operated, and how far the multiplying had progressed in the particular multiplication problem before the error occurred, will relieve the operator of the mental burden above mentioned, and eliminate all chance of mistake when continuing the problem after correction of the error, thereby resulting in a saving in time and effort on the part of the operator.

Figure 2:
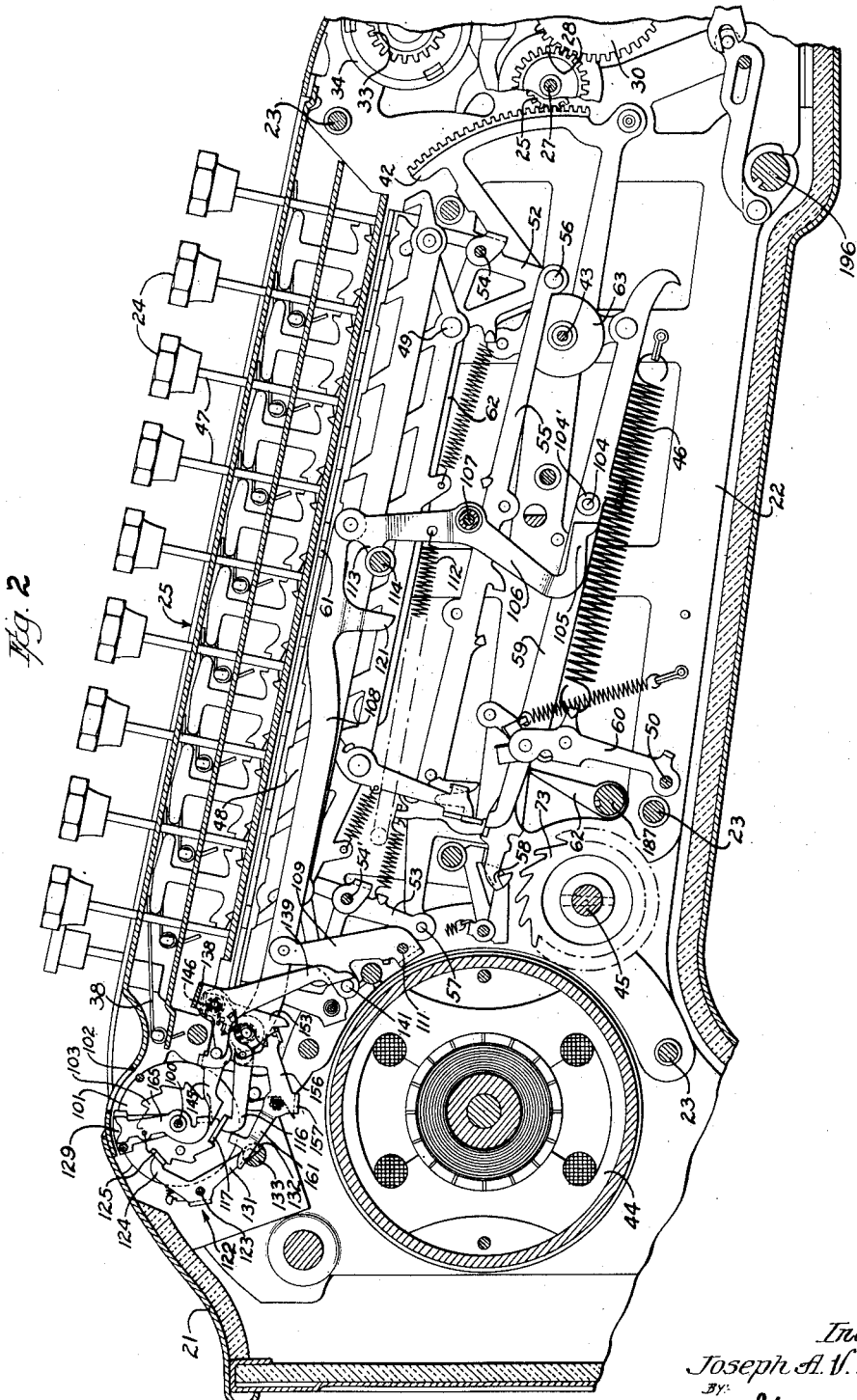
Fig. 2 is a longitudinal vertical section taken adjacent a column of digit keys.

Referring more particularly to the drawings, the exemplary calculating machine is shown as having an outer casing 21 within which the various instrumentalities of the machine are mounted on skeleton frame members or partition plates 22 disposed between the actuating mechanisms of the several denominational orders and secured together in spaced relationship at suitable points by tie-rods 23. A plurality of columns of digital keys 24, normally held in raised position by means of springs 38, are arranged to extend through a keyboard 25 positioned as part of the upper wall of the casing 21, which keys are adapted for manipulation to determine the digital degrees of actuation to be imparted to the different denominational orders of accumulator mechanism. Each column of keys 24 controls the rotation of an accumulator actuating pinion 26 (Fig. 2) journaled upon a transverse shaft 27 that extends across the machine and is supported by the frame members 22. Rotation of each of the actuating pinions 26 is transmitted through an internal ratchet mechanism to a combined lantern wheel and accumulator gear 28 (Fig. 2) which is also journaled on the shaft 27. The gear of the lantern wheel 28 meshes with a carrying gear 30 journaled on a shaft (not shown) which is disposed in parallel relationship to the shaft 27. The carrying gear also meshes with an intermediate gear (not shown), which in turn meshes with a numeral wheel pinion 33 journaled on a transverse shaft (not shown) and fixed to a numeral wheel 34 (Fig. 2).

Carrying mechanism is provided in each denominational order of the accumulator mechanism for the purpose of imparting a digital unit of actuation thereto each time that a tens transfer is to take place from the next lower denominational order of the accumulator. This mechanism, as well as that hereinbefore described, is more fully disclosed in United States Letters Patent No. 1,357,747 and No. 1,357,748, issued on November 2, 1920, so further and more particular description thereof is not thought to be necessary.

The adding is accomplished upon depression of the keys 24 and corresponding actuation of gear sectors 42 (Fig. 2) which are in mesh with the pinions 26, said sector being associated with each denominational section of the accumulator unit in association with its controlling column of keys. The gear sectors and the control and actuating mechanism for them are duplicated for each denominational order of the calculating machine, and a general description of a single set of such mechanism will be sufficient for an understanding of them all, except that they have to be arranged and adapted to cooperate selectively and collectively with the power members.

The gear sectors 42 are mounted upon a shaft 43 which extends through the partition plates 22 of the machine and are adapted to be moved downwardly (viewing Fig. 2) on an idle or setting stroke in amount determined by the value of the particular digital key 24 of the associated column depressed, this amount increasing in graduating steps from "1" to "9." The keys 24 in addition act through a power trip mechanism to effect a connection whereby power supplied by an electric motor 44 (Fig. 2), through a power shaft 45, which is connected to the motor in any suitable manner, is effective to extend a spring 46 associated with the particular order of mechanism with which the key depressed is identified. Release of this spring thereafter accomplishes adding movement in amount determined by the particular digit key of the order depressed. Upon depression of said key, the gear sector 42 is moved through its idle or downward stroke by the power shaft 45 into position to impart proper and accurate digital accumulation to the adding mechanism upon its return movement, which is accomplished by the associated spring 46.

In the calculating machine shown in the drawings, depression of a key 24 causes its stem 47 to engage a parallel motion bar 48 which is pivoted at the front at 49 to a lever 52 and at the rear in the same way to a lever 53. The levers are pivoted in turn upon cross shafts or rods 54 and 54' extending through the partition plates 22. A link 55 is pivotally connected at 56 to the lever 52 and at 57 to the lever 53. The bar 48, levers 52 and 53 and the link 55 form part of a parallel motion device, and are constructed and mounted as shown and described in United States Letters Patent No. 2,063,962, earlier mentioned. Further and more particular description of these parts is therefore thought to be unnecessary.

Each of the gear sectors 42 as stated above, is pivoted upon the cross shaft 43 and through a yielding clutch 63 is articulately connected to a hook 58 by a link 59 (the hook 58 and link 59 being articulately connected to a vertical guide member 60 which in turn is pivotally mounted on a shaft 50). Each gear sector is also articulately connected to a movement controlling bar 61 by a link 62. The mode of operation of the parts is such that upon depression of a key 24 the stem 47 engages and depresses bar 48 imparting motion to the parallel motion device and, through suitable control mechanism which it is thought need not be described in detail, the hook 58 is moved down into engagement with a toothed wheel 73 fast on the power shaft 45, which continually turns in a counter-clockwise direction. The engagement of the hook 58 with the wheels 73 pulls the link 59 toward the rear of the machine, or toward the left, viewing Fig. 2, which imparts downward motion to the gear sector 42 through the yielding clutch 63. Forward motion is thus imparted to the digital control bar 61 until one of several lugs projecting laterally therefrom is stopped by the stem 47 of the key 24 depressed.

The link 59 moves the gear sector 42 downwardly on an idle stroke and into position to impart an adding movement upon release of the hook 58 and contraction of the spring 46. The downward movement of the gear sector 42 is under the control of the digital control bar 61 and the gear sector 42 is halted when it has been moved downwardly the proper distance, enabling it upon return to impart the degree of digital advancement to the adding mechanism which corresponds to the particular key depressed. The yielding clutch 63 permits the continuation of the rearward movement of the link 59 after downward movement of the gear sector 42 has been stopped, and until the end of the power stroke and the automatic release of the hook 58. The release of the hook 58 is accomplished automatically in each instance, after a set increment of action has been imparted to the link 59 by the teeth of the wheel 73. Upon the return stroke (the operative stroke of the gear sector), the yielding clutch 63 permits relative movement of the parts in reverse direction to the beginning of the adding movement, and thereafter the adding actuation is accomplished.

It is apparent, therefore, that upon depression of a key 24 the digital control bar 61 determines the degree and extent of the downward movement of the gear sector 42 and the bar 48 accomplishes connection of the latter to the power mechanism. In this operation, the key which has been operated is held depressed until release of the hook 58 from the wheel 73, when the key will be released and returned to normal raised position. It will be understood that, while no two keys 24 of the same column or denominational order may be operated simultaneously, any key of one order may be operated at the same time as any desired key of any other denominational order or orders.

The present invention contemplates the provision of means for registering the number of key depressions made in the denominational order in which the key representing the lowest denominational figure of value of the multiplicand is depressed during problems of multiplication. As earlier mentioned, keys representing the figures of value of the multiplicand are held at the left hand side of the machine and depressed a number of times corresponding to the highest denominational figure of the multiplier, then shifted to the right for the next denominational order of the multiplier and depressed a number of times corresponding to that figure of the multiplier, etc. The number of denominational shifts will, of course, correspond to the number of figures or denominational places in the multiplier. Therefore, it will be apparent that if means are provided for registering the number of key depressions made in the denominational orders representing the units figure of the multiplicand as it is successively shifted to the right from one denominational place to another, the figures representing the multiplier may be visibly displayed.

In carrying out my invention I provide a set of register wheels 101 (Figs. 1–3 and 5) mounted on a transordinal shaft 100. The register wheels are visible through sight openings 102 arranged in the keyboard 25 immediately to the rear of the denominational orders or columns of keys. Securely fastened in any suitable manner to each numeral wheel 101 is an actuating ratchet 103 adapted for clockwise rotation (Fig. 3), as will presently be described, to visibly record upon the register wheel the number of accumulative actuations made in an associated column or order of keys.

As has been previously described, upon depression of a key, the hook 58 is moved down into engagement with the toothed wheel 73 pulling the link 59 toward the left, viewing Fig. 2. Mounted on the link 59 intermediate its ends is a stud 104 and a dolly roll 104' adapted, upon rearward movement of the link 59, to contact a horizontal arm 105 formed on the lower extremity of a vertical lever 106, rotatably mounted on a transverse shaft 107, and rock the lower part of the lever in a clockwise direction, viewing Fig. 2. At its upper extremity, the lever 106 is articulately connected to a rearwardly extending horizontal connecting link 108 which is supported at its rearward end upon an upright arm 109 which in turn is pivotally mounted on a transverse shaft 111. The lever 106 is normally urged in a counter-clockwise direction under tension of spring 112 and is limited in such movement by engagement of a projection 113, formed on the upper end of the lever 106 with a stop stud 114 fixed in an intermediate frame member 22 which has been omitted from Fig. 2 to give a clear view of the mechanism. Mounted at 115 for slight pivotal movement on the rear extremity of the link 108 is a horizonal actuating ratchet pawl 116 (Fig. 3), which extends rearwardly and is provided at its rear extremity with a lateral lug 117 adapted to be maintained in engagement with the teeth of the ratchet 103 under tension of a spring 118 which is mounted about the pivot 115 and the ends of which are in engagement with lateral projections 119 and 119' (Figs. 3 and 5) formed on its hub portions of the horizontal actuating ratchet pawl 116 and the end of the link 108, respectively.

From the above arrangement, it will be understood that upon depression of a key 24 and resultant rearward movement of the link 59 the stud 104 mounted therein will engage the horizontal arm 105 and rock the lever 106 in a clockwise direction, viewing Fig. 2. Such movement of the lever 106 against the tension of spring 112 causes limited forward movement (to the right, viewing Fig. 2) of the link 108 and the horizontal actuating ratchet pawl 116 sufficient, however, to cause the lug 117 of the ratchet pawl to back up and engage the next tooth of the ratchet 103. Forward movement of the link 108 and horizontal actuating ratchet pawl 116 is limited by engagement of a depending stop arm 121 (Fig. 2) formed on the forward end of the link 108, with the stop stud 114 to prevent overaction from the rapid power movement. When the hook 58 is released from the toothed wheel 73 and the link 59 is moved forwardly under tension of spring 46, the stud 104 is moved out of engagement with the horizontal arm 105 and the vertical lever 106 is urged in a counter-clockwise direction (Fig. 2) under tension of spring 112. Counter-clockwise motion of the vertical lever 106 results in rearward movement of the connecting link 108 and the horizontal actuating ratchet pawl 116. The lug 117 formed on the ratchet pawl 116, if allowed to engage with a tooth of the ratchet 103, will cause clockwise rotation of the ratchet until rearward movement of the connecting link 108 and actuating ratchet pawl 116 is halted by engagement of projection 113 with stop stud 114. The motion communicated to the actuating ratchet 103 by the lug 117 of the ratchet pawl 116 is sufficient to cause the associated numeral wheel 101 to be moved one step to register a different figure progressively on the stroke register wheel. The above action, it will be understood, is repeated each time a digit key is depressed provided it is the rightmost of a series of orders being operated so that there will be registered on the numeral wheel 101 of the stroke register corresponding with the said order a figure corresponding to the number of key depressions made in its associated denominational order.

Means are provided in the form of a back stop, indicated generally at 124 (Figs. 2 and 3), for maintaining the actuating ratchet 103 and numeral wheel 101 in the position to which they are rotated by ratchet pawl 116. One such back stop 124 is provided for each denominational order of stroke registering mechanism and is mounted for pivotal movement on a transordinal shaft 123. Each back stop 124 is constructed with an upwardly extending arm having a lateral projection or lug 125 formed at its upper extremity which is normally maintained in engagement with a tooth of the actuating ratchet 103 under tension of a back stop spring 126 (see Fig. 5), one end of which is connected to a spring arm 127 of the back stop 124, and the other end of which is connected to one arm 128 of a shutter 129, the purpose and function of which will later be described. The back stop 124 is also provided with a depending arm 131, the lower extremity of which is in engagement with a notch 132 cut in a transordinal rock shaft 133 arranged at the rear of the machine in parallel relationship with the shaft 123 for a purpose which will be later explained.

Upon clockwise rotation of the actuating ratchet 103 and associated numeral wheel 101 in a registering action as just described, the back stop as described is positioned to prevent reverse rotation of the numeral wheel 101 and ratchet 103 under tension of the numeral wheel spring 134 (Fig. 7) which is mounted inside of the numeral wheel and about its hub. One end of the spring 134 is connected to a pin 135 mounted in the hub of the numeral wheel, while the other end is retained by a pin 136 fixed in the intermediate frame plate 22.

As earlier mentioned, it is desirable that there be registered the number of key depressions made only in the denominational order in which the units figure of the multiplicand occurs in its use as a check for multiplication upon each successive denominational shift of the multiplicand to the right, and that the number of simultaneous key depressions in all orders of the multiplicand to the left of the units order shall not be registered in the numeral wheels 101 of the stroke register. Therefore, means are provided for preventing the actuation of all numeral wheels of the stroke register to the left of the denominational order in which the key representing the units figure of the multiplicand is depressed.

Mounted on a transordinal shaft 137 (Figs. 3-5) and provided in association with each denominational order of stroke registering mechanism is a loop hubbed lever, indicated generally at 138. The lever 138 is provided with a downwardly and forwardly extending arm 139, the lower extremity of which is in engagement with a pin 141 fixed in an arm 142 of the lever 109. The lever 138 also has formed thereon a rearwardly extending arm 143 positioned in the denominational order to the left of that in which the arm 139 is located, and provided with a laterally projecting lug 144 adapted to overlie the intermediate portion of a rearwardly extending arm 145 provided on a guard lever 146 mounted on the shaft 137 within the looped hub of the lever 138. The rear extremity 150 of the guard lever 146 is adapted to overlie the lug 117 of ratchet pawl 76. A spring 147 is mounted on the shaft 137 within the hub of the guard lever 146 with its free ends engaging the hub of the said lever and a pin 148 fixed to the intermediate frame member 22. The spring 147 serves to urge the levers 138 and 146 in a clockwise direction (Fig. 3) and to maintain the arm 145 in engagement with the lateral lug 144 on the arm 143. With such an arrangement it will be apparent that upon depression of a key in a denominational order representing the units figure of the multiplicand, the link 108, as earlier described, is moved rearwardly and the support arm 109 is rocked in a clockwise direction (Figs. 2 and 3) about its pivot 111. Such motion of the arm 109, through the medium of the pin 141 fixed therein, causes counter-clockwise movement of the lever 138 which, in turn, through the arm 143 and laterally projecting lug 144 moves the arm 145 of the guard lever 146 in the next denominational order to the left downward against the tension of spring 147. As the lug 144 moves downward, the rear end 150 of the guard lever 146 will engage the lug 117 of the ratchet pawl 116 and depress it out of engagement with the teeth of the actuating ratchet 103 where it will be maintained in such position by the arm 145 to prevent its engagement with the next succeeding tooth of the actuating ratchet 103 if a digit key is depressed in that order, which of course will happen if more than one order is being operated.

The above operation of maintaining the ratchet pawl lug 117 out of engageable relationship with the teeth of the actuating ratchet 103 is transmitted through an overlapping means to all orders to the left of the rightmost key depressed. As earlier described, depression of a key will cause motion to be communicated to the lever 138, through its arm 139 and the pin 141, to cause counter-clockwise motion of the lever 138 about its pivot 137 and its action controls the guard lever 145 in the next denominational order to the left to prevent the ratchet pawl lug 117 from engaging the teeth of the actuating ratchet 103 in such higher denominational order. Downward movement of the arm 143 of lever 138 is employed to cause similar movement of all levers 138 to the left of the rightmost order operated. To this end a pin 151 is mounted in the rear extremity of the arm 143 and is positioned in engagement with an associated rearward extension 152 of the lever 138 immediately to its left, viewing Fig. 4. Therefore, when counter-clockwise rotation of a lever 138 results from depression of a key in any particular order, the pin 151 will communicate similar rotation to the lever 138 immediately to its left through its engagement with the extension 152 thereof, and that lever 138 will, in turn, transmit the motion it has received to its adjacent lever 138. As each lever 138 is rocked in a counter-clockwise direction, the projection 144 on the arm 143 thereof will depress its associated guard lever 145, which will serve as a guard to prevent the lug 117 of the ratchet pawl 116 from rising in front of the ratchet teeth as they are operated and thereby prevent its engagement with the next succeeding tooth of the actuating ratchet 103 if a key is depressed in any orders to the left of the rightmost operated order.

The ratchet pawl lugs 117 are thereafter maintained out of engageable relationship with the teeth of the actuating ratchet 103 until the calculation has been completed and the stroke register zeroized. After a zeroizing operation depression of a key in any particular order will be registered upon its associated stroke register numeral wheel 101, but all stroke registering mechanisms to the left of that order will be rendered ineffective, as described, while all those to the right will remain open for operation to register depressions of keys representing figures of value in the multiplicand as the multiplicand is shifted across the machine in accordance with the number of denominational places in the multiplier. Normally, when the stroke register is conditioned for initial operation by depression of a key in any denominational order, the parts are in the position as shown in Figs. 2 and 3. Provided on the lever 138 is a depending arm 153 (Fig. 4) having notches or ratchet teeth 154 and 154', cut therein, one or the other of which, as will be explained, is adapted to be engaged by a lateral projection 155 which is formed on the forwardly extending arm 156 of a dog lever 157. The dog lever 157 is mounted for pivotal movement on a shaft 158 and is also provided with a spring 162 to cause it to engage the ratchet teeth 154 and 154' of the overlapping levers 138 which serves to lock them in their acting position until released, as will later be described. The dog lever 157 also has a vertical hook member 159 formed on the forward extremity of the arm 156 above the engaging lug 155. An arm 161 forming part of the lever 157 extends rearwardly for engagement with the notch 132 in the transordinal shaft 133, previously referred to. The dog lever 157 is urged in a counter-clockwise direction (Figs. 2 and 3) under tension of the spring 162 to maintain the engaging lug 155 in engagement with the ratchet teeth 154 or 154'. As earlier explained, when a key is depressed in one order, its lever 138 is rocked in a counter-clockwise direction, moving its associated arms 143 and 153 downwardly and forwardly. The projection 144 on arm 143 engages the arm 145 of lever 146 to cause it to depress the ratchet pawl lug 117 and actuating arm and render them ineffective to cause actuation of the ratchet 103 as long as they remain so engaged. The arm 145 is maintained in such depressed position to prevent effectual operation of ratchet pawl lug 117 by engagement of the lug 155 with the ratchet tooth 154', in which it was disposed by the counter-clockwise rotation of the lever 138 under tension of springs 147 and 162 which tend to urge the engaged lug 155 and ratchet teeth 154 or 154' into engagement with each other. Thus, in all denominational orders to the left of the rightmost order being operated, the registration is eliminated as the operator shifts from one figure of the multiplicand to the next.

Means are also provided for preventing further rotation of the actuating ratchet 103 and numeral wheel 101 after one complete revolution has been imparted thereto. A visible signal in association with each stroke registering mechanism is also provided to inform the operator that more key strokes have been made than the value of the order will allow of, such for instance as more than nine units of actuation have been imparted to a numeral wheel of the stroke registering mechanism, representing decimals or fractions, as the case may be. Fixed in the ratchet 103 is a pin 163 which, when the numeral wheel 101 is at zero position prior to being actuated, is disposed adjacent and to the left (viewing Figs. 2 and 3) of a lateral lip or lug 164 formed at the lower extremity of a shutter actuating arm 165 which is fixedly secured to one vertical arm of the shutter 129. The shutters 129 and their actuating arms 165 are pivotally mounted on the numeral wheel shaft 100 and are normally restrained in a position to the rear of the sight opening 102 by means of the back stop spring, one end of which is connected to the other arm 128 of the shutter 129. Rotational movement of the shutter is limited by engagement of stop surfaces 166 at the upper extremity of the actuating arm 165 with stop studs 167 and 167' fixed in the right-hand side of the intermediate frame members 22. As the numeral wheel 101 and its actuating ratchet 103 is advanced one step for each key depression through the action of the connecting link 108, ratchet pawl 116 and ratchet pawl lug 117 to register the number of key depressions made in its associated denominational order, the pin 163 fixed in the ratchet 103 will be rotated with it. When the numeral wheel 101 reaches the "9" position to indicate nine key depressions or adding actuations have been effected in that order, the pin 163 will have been positioned adjacent and to the right (viewing Figs. 2 and 3) of the lateral lip or lug 164. Therefore, upon the next key depression, when the ratchet pawl lug 117 engages a tooth of the ratchet 103 and rotates it in a clockwise direction (Fig. 3), the pin 163 will, through its engagement with the lip 164, compel clockwise rotation of the actuating arm 165 and shutter 129 to which it is secured, against the tension of spring 126, until halted by engagement of stop portion 166 with stop stud 167. The shutter 129, which may be of any distinctive color, such as red, is then positioned between the sight opening 102 and the numeral wheel 101 to close the sight opening and serve as a visible signal to the operator that more than nine key depressions (or otherwise permissible number) have taken place in that particular order.

After the numeral wheel 101 has made one complete revolution, as just described, and the shutter 129 is in operative position, further rotation of the numeral wheel and actuating ratchet 103 is prevented by engagement of pin 163 with lip 164 of the shutter actuating arm 165 which is held from further clockwise movement by engagement of its stop surface 166 with stop stud 167. As the pin 163 closes the shutter, it engages the top surface of the end 150 of the guard lever 145 carrying it down into a position to prevent the lug 117 of the ratchet pawl 116 from engaging the teeth of the register wheel ratchet 103. Thus further action of said register from any continuous key action is prevented.

Means are provided for independently returning all the numeral wheels 101 of the stroke register to zero position under the tension of the springs 124 and to likewise recondition the stroke registering mechanism for actuation in any denominational order. For this purpose there is provided on the right hand side of the machine (Fig. 1) a finger piece 168 which extends downwardly into the machine through an elongated slot 169 and is secured to a guard member in the form of a sector 171 designed to cover the slot and forming, in this instance, a part of a lever 172 (Fig. 6), which is pivotally mounted on a stud 173 fixed to the outer frame of the machine. Articulately connected to a curved, downwardly extending arm 174 of the lever 172 is a vertical link 175 which at its other end is connected to a horizontal, forwardly extending arm 176 of an elbow lever 177. The lever 177 is provided with a U-shaped hub portion 178 mounted on a shaft 179 and is also provided with an upwardly-extending arm 181 which at its free end is in engagement with a pin 182 fixed in a link 183 intermediate its ends. At its upper extremity the link 183 is articulately connected to an arm 184 which is rigidly secured to the notched transordinal rock shaft 133. At its lower end the link 183 is articulately connected to an arm 185 which is fixedly secured to a hub 186 rotatably mounted upon a transordinal rock shaft 187 for a purpose which will presently be explained. A spring 180, on one end of which is connected to the hub 178 of lever 177 and the other end of which is connected to the arm 185, normally maintains the parts in the position of Fig. 6. Through the above arrangement, it will be apparent that forward movement, to the left viewing Fig. 6, of the finger piece 168 will cause counter-clockwise motion of the lever 172 which, through connecting link 175, causes similar movement to the elbow lever 177 against the tension of spring 180. Counter-clockwise motion of the lever 177, through the arm 181 and pin 182, imparts downward movement to the link 183 and counter-clockwise action (Fig. 6) to the notched rock shaft 133. As earlier described, the lower extremities of the depending arms 131 of the back stops 124 are maintained in engagement with notches 132 of the shaft 133 under tension of springs 126. When, however, the shaft 133 is rocked in a clockwise (Fig. 3) direction upon manipulation of the finger piece 168, the back stops 124 are rocked in a counter-clockwise direction about their pivots 123 and their lateral stop lugs 125 are removed from engagement with the teeth of the ratchets 103 against the tension of their springs 126. Simultaneously with removal of the back stops from engagement with the teeth of the ratchets, rocking of the shaft 133 also causes clockwise (Fig. 3) rotation of the levers 157 about their pivot 158 through the engagement of their rearwardly extending arms 161 with notches 132 of the rock shaft 133. Clockwise motion of the levers 157 causes their upright hooks 159 to engage the pins 186 (Fig. 3) fixed in the guard levers 146 and pull the said levers 146 down so that their ends 150 depress the ratchet pawl lugs 117 and thereby remove them from engagement with the teeth of the ratchets 103. With the ratchets 103 so cleared against backward rotation, the numeral wheels which may have been turned to register strokes in the different orders will be allowed to return under tension of their springs 134 until halted at zero positions by their pin 163 engaging the lateral lip 164 of the shutter actuating arms 165 which will have been returned to the inoperative position of Fig. 3 under tension of spring 126, if any had been closed by error. As the dog levers 156 are operated by the rocking of the transordinal shaft 133 their detaining lugs 155 are freed from the ratchet teeth 154' and 154 so that any of the overlapping levers 138 which may have been set will be freed and will return to normal under the action of springs 147. After the numeral wheels have returned to zero and other parts, as stated, return to normal position, release of the finger piece 168 allows the rock shaft 133 to be rocked back to normal under tension of spring 180 allowing the back stops 124 and horizontal actuating ratchet pawls 116 to reengage the teeth of the ratchet 103 under tension of their springs 126 and 118, respectively, and the dog levers 157 to return to normal under the action of their springs 162. In such a cleared position, any denominational order of stroke registering mechanism is conditioned for operation upon depression of a key in its associated order to record the number of strokes therein.

Means are also provided for causing the return of the numeral wheels of the stroke register to zero position and reconditioning the mechanism thereof coincident with return of the regular register numeral wheels 34 to zero position upon manipulation of the regular clearing or zeroizing crank 188. The zeroizing mechanism illustrated is of the type disclosed in United States Letters Patent No. 2,063,962, earlier mentioned, and only a brief description of the mechanism pertinent to the present invention is thought to be necessary. The zeroizing crank 188 is mounted upon a short transverse shaft upon which is fixedly secured an inner segment 189 (Fig. 6) to which is pivoted a link 191 which in turn is pivoted to a depending lever 192 pivoted at 193 on the fixed frame. The lower end of the lever 192 is articulately connected by means of a short link 194 with an arm 195 rotatably mounted with respect to a transordinal shaft 196 which is journaled in the fixed frame. The arm 195 is provided with an engaging face adapted to contact with a rocker arm 197 fast to the shaft 196. When the parts are in the relative position indicated in Fig. 6, a short pivotal movement of the zeroizing lever 188 toward the left will, through the segment 189, the link 191, lever 192, short link 194, arm 195 and rocker arm 197, impart a short rocking movement to the shaft 196 in a counter-clockwise direction. Such movement of the shaft 196 results, through mechanism fully described in the aforementioned patent, in zeroizing of the numeral wheels 34.

Figure 1:
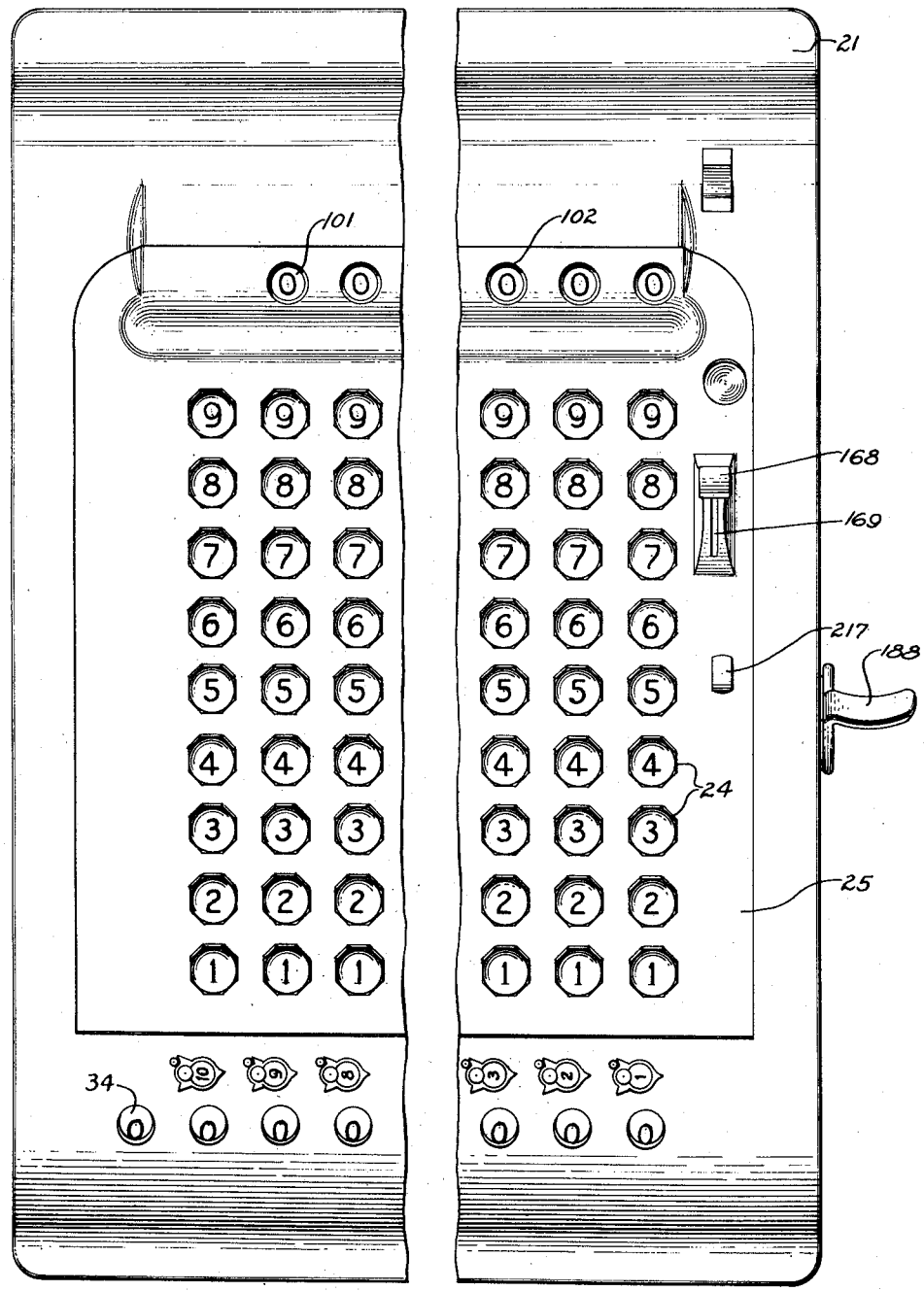
Figure 1 is a top plan view, broken away centrally from front to back, of a calculating machine embodying the invention.

Articulately connected to an arm of the shaft 196 at the left hand side of the machine, viewing Fig. 1, is the forward link 198 (Fig. 6) of a detaining toggle which is connected at 199 to the rear link 201 of the said toggle. The link 201 is rotatably mounted on a short transverse shaft 202 upon which is also mounted an arm 203 to which a rearwardly extending link 204 is articulately connected by a stud 221 having a head extending to the left acting to receive action from a projection 222 of the link 201 when the toggle is broken (as shown in Fig. 6). At its rear extremity the link 204 is pivotally connected to an arm 205 which is rigidly mounted upon the transordinal rock shaft 187.

At the right hand side of the machine, adjacent the arm 185, there is rigidly mounted upon the shaft 187 an arm 206 which is normally in engagement with a stud 207 fixed in the arm 185. When the zeroizing lever 188 is moved to the left, viewing Fig. 6, and the shaft 196 is rocked in a counter-clockwise direction, as just described, the detaining toggle links 198 and 201 will be made up, swinging downward and forward the link 201 thereof, which will release the stud 221 from the pressure of the projection 222 which, when the toggle is broken, as shown in Fig. 6, holds the said stud 221, arm 203 and link 204 against the pull of a spring 200 connected between arm 203 and link 204. The pull of said spring 200 is great enough to rock the transordinal shaft 187 counter-clockwise and through the arm 206 will rock the arm 185 in a counter-clockwise direction through contact with pin 207, pulling the link 183 downward and forward, producing a clearing and zeroizing action of the stroke register and its related mechanism as previously described for manipulation of the individual clearing device 168. The shafts 196, 187 and 133 are maintained in the position to which they are rocked when the pivot 199 of the detaining toggle 198, 201 falls below center, in which position it is maintained under tension of spring 223. Thereafter, upon depression of a key 24 and engagement of hook 58 and toothed wheel 73 in any order, the guide arm 60 is rocked in a counter-clockwise direction (Fig. 2) about its pivot 59 and strikes the arm 62 in that order, which is fixedly secured to the rock shaft 187, thus rocking the shaft in a clockwise direction (Fig. 6) and removing the arm 206 from engagement with the stud 207 in the arm 185. Partial rotation of shaft 187 is transmitted to shaft 202 to rock that shaft in the same direction to break toggle 199, 201. Disengagement of the arm 206 from the stud 207 allows the arm 185 to be rocked in a clockwise direction which causes, through the medium of the link 183, counter-clockwise action (Fig. 3) of the notched shaft 133, which allows the return of the back stop and actuating pawls of the stroke register and action of the overlapping levers 138 to be in position for a new registration of the stroke counter before the hook 58 is released from the toothed wheel 73, to cause registration in the associated stroke register numeral wheel.

Means are provided for making the stroke registering mechanism inoperative at the will of the operator so that no registration is made in its numeral wheels 101 upon depression of keys 24 in any denominational order This is accomplished by causing the stroke register zeroizing sector lever 172 to be locked in a forward or operative position to maintain the actuating pawl ratchet lugs 117 out of engagement with the teeth of the register wheel ratchet 103. To this end there is provided a lock lever 208 (Fig. 6) pivotally mounted on a stud 209 fixed in the outer frame of the machine. The lever 208 is provided with upright arms 211 and 212 which are provided at their respective extremities with a lateral projection 213 and a hook 214. A spring 215 normally urges the lever 208 in a clockwise direction (viewing Fig. 6) but is restrained against such movement by engagement of the vertical stem 216 of finger button 217 with the projection 213. The stem 216 extends through a slot in the top plate of the keyboard 25 and is adapted to be moved forwardly and rearwardly (Fig. 1) a limited distance. A spring friction plate 218 (Fig. 6) tends to maintain the finger button 217 and stem 216 in the position to which they are moved. When it is desired that the stroke register be made inoperative, the finger button 217 is moved rearwardly, to the right viewing Fig. 6, thus allowing the lever 208 to be rocked in a clockwise direction under tension of its spring 215 and disposing the hook 214 in the path of movement of a pin 219 which is fixed in the forward end and side of the sector lever 172 forming the zeroizing lever for the stroke register. When the stroke register zeroizing finger piece 168 is moved to the left, as in Fig. 6, and the finger button 217 is pushed rearward, the pin 219 will be engaged by the hook 214 and the zeroizing lever 172 will be locked in operative position. As earlier described, such movement of the lever 172 causes the notched shaft 133 to clear the ratchet pawl lugs 117 from engagement with the teeth of the ratchet 103. With the parts locked in such position, subsequent depressions of keys 24 are ineffective to cause actuation of the stroke register wheels 101 as the actuating pawl lugs 117 are held out of engagement with the ratchets 103 by the depressed guard levers 145. To again make the stroke register operative, it is necessary only to move the finger button 217 forward or to the left, as in Fig. 6, the action of which is obvious from previous description of the return movement of the stroke clearing mechanism.

It is thought that the invention and its attendant advantages will be understood from the foregoing description, and it will be apparent that various changes may be made in the form, construction and arrangement of the parts without departing from the spirit and scope of the invention or sacrificing its material advantages, the form hereinbefore described and illustrated in the drawings being merely a preferred embodiment thereof.

While the operation of the novel stroke counter has been described with particular reference to multiplication, it will be evident that the mechanism will similarly count the key strokes and register them for the number of times the divisor is subtracted to arrive at the dividend. Thus dividing and multiplying on calculating machines of the type herein shown are greatly simplified.

It will also be appreciated that the number of strokes to be registered by the mechanism may vary according to whatever the order is designed to represent. For instance, as in the machine illustrated in the drawings, the value of each order being decimal, the stroke register, which values only reach to 9 for each order, whereas in fractions such as 8ths, 12ths and 16ths, English currency and India currency, the stroke register wheels may have corresponding stroke values, the mechanism being arranged to operate accordingly and the shutter to close the sight aperture after any number of strokes greater than the denominational value of its order.

In view of the fact that the process of multiplication and division on the key responsive type of calculators, whether key-driven or power-driven, is so commonly known by those interested in the art it will be unnecessary to herein set forth additional examples of the procedure. The description of the working of the mechanism for recording same should be sufficient for a clear understanding of how the machine registers the result in either case.

I claim as my invention:

1. In a calculator having various denominational orders of key-responsive adding mechanism and registering mechanism instantly responsive to key depression, means for recording the number of key strokes including a special register having a numbered wheel for each order, means connecting a different one of said numbered wheels to a different order of the adding mechanism for registering in the special register key strokes made in said order, means for disconnecting the connecting means in each order and means actuated upon depression of a key to operate the disconnecting means in all orders to the left of the depressed key, a signal device for each numbered wheel of the special register and operated automatically upon depression of a key in any order more times than the denominational value of said order, manual means for clearing the special register and the signal device, said clearing means operating to reconnect all disconnected connecting means, devices for clearing the registering mechanism, and means connected with the last-named devices for operating said clearing means whereby both registers may be simultaneously cleared and the connecting means may be reconnected in all orders.

2. In a calculator having various denominational orders of key-responsive adding and registering mechanism each immediately responsive to key-actuation, means for recording the number of key strokes including a special register having a numbered wheel for each order, means connecting a different one of said numbered wheels to a different order of the adding mechanism for registering in the special register key strokes made in said order, means for disconnecting the connecting means in each order, and means actuated automatically upon depression of a key to operate the disconnecting means in all orders to the left of the depressed key.

3. In a calculator having various denominational orders of key-responsive adding mechanism and registering mechanism instantly responsive to key depression, means for recording the number of key strokes including a special register having a numbered wheel for each order, means connecting a different one of said numbered wheels to a different order of the adding mechanism for registering in the special register key strokes made in said order, means for disconnecting the connecting means in each order, means actuated automatically upon depression of a key to operate the disconnecting means in all orders to the left of the depressed key, and manually actuable clearing means for clearing said special register, said clearing means operating upon actuation to reconnect all disconnected connecting means.

4. In a calculating machine responsive to key actuation and having sufficient orders of registering mechanism unified with key-responsive adding mechanism to serve in multiplication or division, means for recording the number of key strokes including a special register having a plurality of orders, means operatively connecting each of the orders of the special register with a different one of the orders of the adding mechanism to cause registration in the special register of the number of key strokes made in each order of adding mechanism and means provided in each order of the adding mechanism and operating upon depression of any one of the ordinal keys in that order for rendering inoperative the connecting means associated with all orders of adding mechanism to the left of the depressed key.

5. In a calculating machine responsive to key actuation and having sufficient orders of registering mechanism unified with key-responsive adding mechanism to serve in multiplication or division, means for recording the number of key strokes including a special register, means connecting the special register with the adding mechanism in each order for registering in said special register the number of key strokes made in each order, disconnecting means provided in each order adapted to render inoperative the connecting means in said order, means interconnecting the disconnecting means in each order with the adding mechanism in each order to the right of said last mentioned disconnecting means for operating the disconnecting means upon depression of a key associated with said last mentioned order of adding mechanism, and means provided in each order of disconnecting means and actuated with operation of a disconnecting means to operate the disconnecting means in the next order to the left.

6. In a calculating machine responsive to key actuation and having sufficient orders of registering mechanism unified with key-responsive adding mechanism to serve in multiplication or division, means for recording the number of key strokes including a special register, means connecting the special register with the adding mechanism in each order for registering in said special register the number of key strokes made in each order, disconnecting means provided in each order adapted to render inoperative the connecting means in said order, means interconnecting the disconnecting means in each order with the adding mechanism in each order to the right of said last mentioned order of disconnecting means for operating the disconnecting means upon depression of a key associated with said last mentioned order of adding mechanism, means provided in each order of disconnecting means and actuated with operation of a disconnecting means in an order to operate the disconnecting means in the next order to the left, a manually actuable clearing mechanism to zeroize the registering mechanism, and means connecting the clearing mechanism to the connecting means in each order and operated upon actuation of the clearing means for rendering operative the connecting means in all orders.

7. In a calculating machine responsive to key actuation and having sufficient orders of registering mechanism unified with key-responsive adding mechanism to serve in multiplication or division, means for recording the number of key strokes including a special register, means connecting the special register with the adding mechanism in each order for registering in said special register the number of key strokes made in each order, disconnecting means provided in each order adapted to render inoperative the connecting means in said order, means interconnecting the disconnecting means with the adding mechanism for operating the disconnecting means upon depression of a key, means provided in said orders and actuated with operation of a disconnecting means to operate the disconnecting means in the next order to the left, and manually operated means for rendering inoperative the connecting means in all orders.

8. In a calculating machine having several denominational orders of register mechanism unified with key-responsive adding mechanism, each register mechanism being instantly responsive to key depression for operation, means for recording the number of key strokes in each order including an ordinally organized special register, means connecting each of the orders of the special register to a different one of the orders of adding mechanism and operated automatically upon key depression for recording in the special register the number of key strokes in each order of adding mechanism up to and including the denominational value of said order, means for disconnecting the connecting means in each order of adding mechanism, and means operated upon depression of any one of the ordinal keys in any one or more orders of adding mechanism to operate the disconnecting means in all orders of adding mechanism to the left of the rightmost key depressed.

9. In a multiple order calculating machine having sufficient orders for multiplication and division, keys for each order, adding mechanism in each order and operated by the keys and registering mechanism for each order, means for recording the number of key strokes including an ordinally organized special register, means connecting the special register to the adding mechanism in each order and operated automatically upon key depression for registering in the special register the number of times a group of keys is repeatedly depressed, means for disconnecting the connecting means and means operated automatically upon depression of a group of keys to operate disconnecting means in all orders to the left of the rightmost key depressed whereby said number is registered only in the order of the rightmost key depressed, and means for clearing the register mechanism and simultaneously reconnecting the connecting means in all orders to reset the machine for a new example.

JOSEPH A. V. TURCK.

REFERENCES CITED

The following references are of record in the file of this patent:

UNITED STATES PATENTS

| Number | Name | Date |
| --- | --- | --- |
| 628,273 | Mallmann | July 4, 1899 |
| 1,208,288 | Carlin | Dec. 12, 1916 |
| 1,297,711 | Mays | Mar. 18, 1919 |
| 1,309,536 | Mays | July 8, 1919 |
| 1,874,719 | Von Pein | Aug. 30, 1932 |
| 2,104,051 | Niemann | Jan. 4, 1938 |
| 2,241,102 | Turck | May 6, 1941 |
| 2,311,354 | Friden et al. | Feb. 16, 1943 |
| 2,436,668 | Pødenphant | Feb. 24, 1948 |